March 10, 1953 W. J. GRUEN 2,631,240

SWEEP VOLTAGE GENERATOR

Filed March 28, 1951

Inventor:
Wolf J. Gruen,
by Merton D Morse
His Attorney.

Patented Mar. 10, 1953 2,631,240

UNITED STATES PATENT OFFICE 2,631,240

SWEEP VOLTAGE GENERATOR

Wolf J. Gruen, Syracuse, N. Y., assignor to General Electric Company, a corporation of New York Application March 28, 1951, Serial No. 218,025

4 Claims. (Cl. 250—36)

Figure 1:
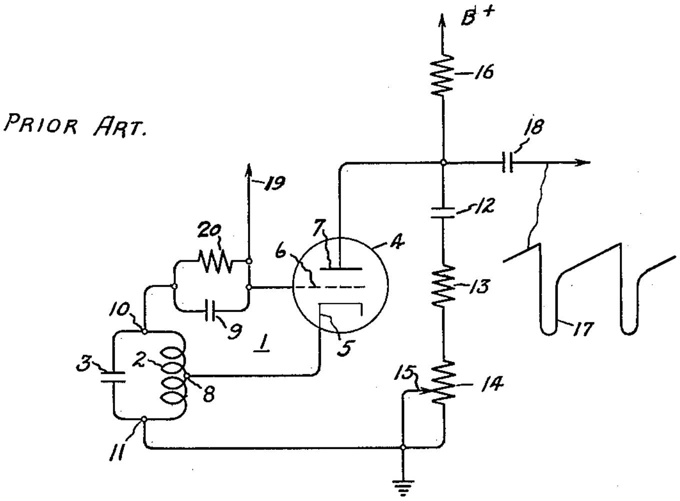
Fig. 1. PRIOR ART.

My invention relates to sweep voltage generators and more particularly to such generators having peaking controls. While my invention is of general utility, it has particular application to trapezoidal sweep voltage generators of a television broadcast receiver.

In sweep generators adapted to develop trapezoidal voltages necessary for electromagnetic deflection in cathode ray tubes, it has been customary in the prior art to provide suitable means to modify the trapezoidal voltage for purposes of linearization. One such type of sweep generator having means to modify the generated trapezoidal voltage employs a Hartley oscillator operating in class C whose periodic pulses of current discharge a sweep condenser. The sweep condenser, which is similarly positioned in circuit arrangement to the usual blocking condenser found in a conventional Hartley oscillator circuit employing shunt feed, has a charging circuit including a serially-connected variable peaking resistor which affects the slope of the sweep voltage developed across the condenser and resistor. The variable resistor may change the slope of the developed sweep voltage by determining the voltage point to which the condenser discharges during that portion of each sweep cycle in which the electron discharge device is conducting. This variable peaking resistor supplies the rectangular component in the developed trapezoidal voltage.

In prior art circuit arrangements, when such a peaking control was changed, it was noticed that the excitation of the oscillator also changed. This resulted from the fact that the different settings of the peaking control varied the impedance seen by the plate of the discharge device. The change in impedance was coupled into the resonant circuit of the oscillator and caused frequency instability with an accompanying change in excitation.

With the different settings of the peaking control and the correlative changes in oscillator frequency, there were found to occur undesirable variations in the self-bias voltage which was automatically developed across a conventional grid leak resistor in the oscillator circuit. It is known that the bias voltage in such an oscillator is dependent upon the grid excitation. Since this bias voltage may be employed in an external circuit as a convenient source of negative potential or as a control voltage, it is most desirable to avoid voltage variations at this point.

It is therefore a primary object of my invention to provide an improved sweep voltage generator employing a shunt fed Hartley oscillator operating in class C and having a sweep voltage peaking control in its plate-feedback circuit in which variations of that control fail to adversely affect the oscillator frequency.

It is another object of my invention to provide an improved self-biased Hartley oscillatory circuit for generating a trapezoidal voltage having a peaking control in which the developed self-bias voltage remains substantially constant under changing peaking control conditions.

It is another object of my invention to provide an improved trapezoidal sweep voltage generator having an oscillatory discharge circuit and a peaking control in the discharge circuit in which variations in the settings of such control do not materially affect either the frequency of the oscillations or the amplitude of the developed self-bias voltage.

More specifically, it is an object of my invention to provide a sweep voltage generator of improved stability comprising a Hartley oscillator, operating in class C, in which changes of a variable peaking resistor fail to materially affect not only the oscillation frequency but also the excitation of the oscillator.

For additional objects and advantages and for a better understanding of my invention, attention is now directed to the following description and accompanying drawings. The features of my invention which are believed to be novel are particularly pointed out in the appended claims.

Figure 2:
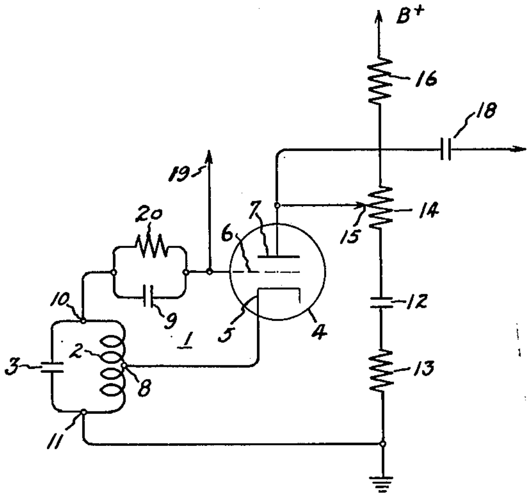

In the drawing:

Fig. 1 is a circuit diagram of a trapezoidal sweep voltage generator constructed in accordance with the teaching of the prior art, which will be referred to in developing the theory of operation of the present invention; and Fig. 2 is a circuit diagram of the trapezoidal sweep voltage generator constructed in accordance with the present invention.

Referring to Fig. 1 of the drawing, there is shown a sweep voltage generator having an oscillatory circuit 1 of the Hartley type which includes a tuned circuit comprising a tapped inductance 2 and capacitor 3. The circuit includes an electron discharge device 4 having a cathode 5, control electrode 6 and anode 7. The cathode 5 is connected to a suitable tap 8 on the coil 2. The control electrode 6 is connected to one terminal 10 of the tuned circuit through the grid leak 20 and grid condenser 9. The other terminal 11 of the oscillatory circuit is connected to ground potential. The anode 7 is connected in shunt-feed manner through isolating resistor 16 to a suitable source of operating potential B+. To complete the oscillatory feedback circuit, the anode 7 is also connected to ground through an RC network comprising condenser 12, fixed resistor 13 and peaking resistor 14 having a variable tap 15.

The values of the circuit parameters are so chosen that it operates as a class C oscillator, i. e., that the tube is biased below cut-off so that only a portion of the positive swing of the sinusoidal grid signal causes anode current to flow.

The trapezoidal voltage 17 is developed across the condenser 12 and resistors 13 and 14 by the charging of the condenser 12 through the serially-connected resistors from the operating potential source B+ and the discharging thereof through the vacuum tube 4. This output voltage 17 may be fed to a following power amplifier and suitable deflection coils through the coupling condenser 18.

The tapped resistor 14, commonly known as the peaking control, in conjunction with fixed resistor 13, determines the point to which the condenser 12 discharges during the discharge or fly-back portion of each sweep cycle. In this circuit, if the resistance in the peaking circuit is increased by moving the tap 15 towards ground, the grid excitation to the oscillator is decreased because of the increase in the impedance seen by the plate of the tube looking towards the tank circuit. As is known, the negative bias voltage developed across the grid leak 20 is dependent primarily upon the grid excitation so that if the grid excitation decreases, the bias voltage will also decrease. Thus an increase in resistance in the peaking circuit will not only cause undesirable instability in the voltage appearing across the grid leak 20 and at the terminal 19, provided to tap off the developed negative self-bias for external use, but also undesirable frequency changes. Of course, these same undesirable effects on the grid voltage and frequency stability prevail when the peaking resistance is decreased.

In Fig. 2 I have shown my improved sweep voltage generator having a new plate circuit connection in which the oscillatory section 1 remains the same. In this circuit arrangement, the sweep voltage output is still developed across the serially-connected RC network comprising resistor 13, condenser 12, and a portion of tapped resistor 14. The output is taken off through coupling capacitor 18 but in this circuit arrangement the tap 15 of the peaking control 14 is connected directly to the anode 7 instead of to ground as shown in Fig. 1.

In this circuit connection, the resistors 16 and 14 are connected between the positive terminal of the source of operating potential and condenser 12. When the resistance is increased between the plate and ground by moving tap 15 upward, the resistance from the plate to B+ is decreased. This increased resistance from plate to ground and decreased resistance from plate to cathode also results in a change of plate voltage, thus effectively maintaining prior operating conditions of frequency and developed grid voltage. The relationship between the law of change of plate voltage to the change of impedance from plate to ground during the peaking adjustment appears to be empirical.

This new plate circuit arrangement materially increases the stability of the oscillator and decreases the grid voltage variation, as compared to the circuit arrangement shown in Fig. 1, when the peaking resistance is changed.

In the circuit arrangement shown in Fig. 2, the identical trapezoidal voltage 17 may still be developed since the condenser 12 may still charge to the same peak voltage during the charging portion of the sweep cycle and may discharge the same amount determined essentially by the RC time constant in the discharge circuit which comprises the limiting resistor 13, the condenser 12, a portion of the peaking control resistance 14 in series with the anode 7, and the anode-to-ground path of the electron discharge device.

It will be understood that resistor 13 is provided so that a small rectangular voltage component will always be developed even when the tap 15 on the peaking control 14 is nearest the condenser 12. However, it is possible to achieve the same desired stability of operation by omitting this resistor.

It may further be explained that this improved plate circuit arrangement reduces the percentage change of total plate to ground impedance for given changes in the resistance appearing in the discharge circuit. It wil be seen that the impedance seen by the plate of the vacuum tube 4 essentially comprises the parallel circuit consisting of the peaking control circuit from the tap 15 to ground through the condenser 12 and resistor 13, and a parallel path from the tap 15 through the isolating resistance 16 and the operating potential source to ground. Therefore, as the tap is moved along the peaking resistor 14, the total impedance as seen by the tube is relatively unaffected thereby maintaining the frequency of oscillation constant and the negative grid bias voltage essentially the same.

Laboratory results with my new circuit arrangement indicate that the bias voltage variation is reduced to a negligible amount, which effects a marked improvement in the operation of the sweep generator under varying peaking control settings.

Merely by way of illustration and not in any sense by way of limitation, the following are representative component values which were found to give satisfactory operation in a particular application of the sweep generator of Fig. 2 to a laboratory television broadcast receiver employing 15.75 kc. line-scanning circuits:

Tube 4=½ 6SN7
Resistor 13=10,000 ohms
Capacitor 12=3,900 mmf.
Resistor 14=25,000 ohms
Resistor 16=33,000 ohms
Capacitor 18=5,000 mmf.
Resistor 20=68,000 ohms
Capacitor 9=1,800 mmf.

Thus, I have provided a trapezoidal sweep voltage generator including a self-biased Hartley oscillator having improved frequency stability and improved stability of developed negative grid bias under varying peaking resistance conditions.

While a specific embodiment of my invention has been shown and described and certain modifications therein have been suggested, it will, of course, be understood that various other modifications may be made without departing from the principles of my invention. The appended claims are therefore intended to cover any such modifications within the true spirit and scope of the invention.

What I claim as new and desire to secure by Letters Patent of the United States is:

1. A trapezoidal sweep voltage generator comprising a source of unidirectional operating potential having positive and negative terminals, a sweep circuit connected from said positive terminal to said negative terminal and including a resistor and a sweep condenser in the order named, said resistor having an adjustable tap thereon, means for periodically discharging said condenser comprising an oscillator including an electron discharge device having an anode, control electrode and cathode, a tuned frequency-control circuit connected between said control electrode and said negative terminal and including a self-biasing network, a connection from said cathode to an intermediate point on said frequency-control circuit, and means for applying operating voltage to said oscillator comprising a connection from said adjustable tap to said anode, said self-biasing network being adjusted for class C operation of said oscillator, said adjustable tap providing a peaking control for adjusting the voltage waveform developed across said sweep circuit.

2. A trapezoidal sweep voltage generator comprising a source of unidirectional operating potential having positive and negative terminals, a sweep circuit connected from said positive terminal to said negative terminal and including a resistor and a sweep condenser in the order named, said resistor having an adjustable tap thereon, means for periodically discharging said condenser comprising an oscillator including an electron discharge device having an anode, control electrode and cathode, a tuned frequency-control circuit connected between said control electrode and said negative terminal and including a self-biasing network, a connection from said cathode to an intermediate point on said frequency-control circuit, means for applying operating voltage to said oscillator comprising a direct conductive connection from said tap to said anode, said self-biasing network being adjusted for class C operation of said oscillator, said adjustable tap providing a peaking control for adjusting the voltage waveform developed across said sweep circuit, and external circuit means utilizing the self-bias voltage developed across said network.

3. A trapezoidal sweep voltage generator comprising a source of unidirectional operating potential having positive and negative terminals, a sweep circuit connected from said positive terminal to said negative terminal and including a resistor and a sweep condenser in the order named, said resistor having an adjustable tap thereon, a means for periodically discharging said condenser comprising a class C Hartley oscillator circuit, said oscillator circuit including an electron discharge device having an anode, cathode and control grid, an oscillatory circuit including a tapped inductance connected between said control grid and said negative terminal and also including a grid-bias resistor and condenser in parallel, a connection from said cathode to an intermediate tap point on said inductance, and a direct connection from said adjustable tap to said anode.

4. A trapezoidal sweep voltage generator comprising a source of unidirectional operating potential having positive and negative terminals, a sweep circuit connected from said positive terminal to said negative terminal and including a first resistor, a sweep condenser and a second resistor in the order named, said first resistor having an adjustable tap thereon, means for periodically discharging said condenser comprising an oscillator including an electron discharge device having an anode, control electrode and cathode, a tuned frequency-control circuit connected between said control electrode and said negative terminal and including a self-biasing network, a connection from said cathode to an intermediate point on said frequency-control circuit, means for applying operating voltage to said oscillator comprising a connection from said adjustable tap to said anode, said self-biasing network being adjusted for class C operation of said oscillator, said adjustable tap providing a peaking control for adjusting the voltage waveform developed across said sweep circuit, and external circuit means utilizing the self-bias voltage developed across said network.

WOLF J. GRUEN.

REFERENCES CITED

The following references are of record in the file of this patent:

UNITED STATES PATENTS

| Number | Name | Date |
|---|---|---|
| 2,221,069 | Andrieu | Nov. 12, 1940 |
| 2,297,742 | Campbell | Oct. 6, 1942 |